United States Patent [19]

Preiser

[11] Patent Number: 4,987,695
[45] Date of Patent: Jan. 29, 1991

[54] RETRACTABLE BARBLESS FISHING LURE

[76] Inventor: Herbert W. Preiser, 510 Oak Knoll, Barrington, Ill. 60010

[21] Appl. No.: 533,474

[22] Filed: Jun. 5, 1990

[51] Int. Cl.⁵ ............................................. A01K 85/00
[52] U.S. Cl. .................................... 43/42.41; 43/43.16
[58] Field of Search ................. 43/42.41, 43.2, 43.4, 43/42.02, 42.04, 42.05, 43.16

[56] References Cited

U.S. PATENT DOCUMENTS

| | | | |
|---|---|---|---|
| 4,068,400 | 1/1978 | McCoy | 43/43.2 |
| 4,768,304 | 9/1988 | Preiser | 43/43.16 |
| 4,769,940 | 9/1988 | Doss | 43/42.5 |
| 4,796,375 | 1/1989 | Wilson | 43/42.05 |
| 4,914,851 | 4/1990 | Acker | 43/42.05 |
| 4,922,649 | 5/1990 | Mitchell | 43/43.4 |

Primary Examiner—Richard K. Seidel
Assistant Examiner—Chuck Y. Mah
Attorney, Agent, or Firm—Wallenstein, Wagner & Hattis, Ltd.

[57] ABSTRACT

A terminal tackle sport fishing device (10) comprising a body (11) having a front end (12) and a rear end (13). The body also having a longitudinal channel (16) through the body between the front and rear ends. A shank (18) having a one end (20) and an other end (22), and also having an outer diameter less than the inner diameter of the longitudinal channel extends through the longitudinal channel such that the one end and the other end of the shank project from the front and rear ends of the body. A means for attaching (24) attaches the one end of the shank to a fishing line (26). A barbless bend portion (30) is integral with the other end of the shank and having a sharpened point (31) at a terminal other end thereof. A deformable sleeve (32) slidably and substantially conceals the barbless bend portion.

16 Claims, 1 Drawing Sheet

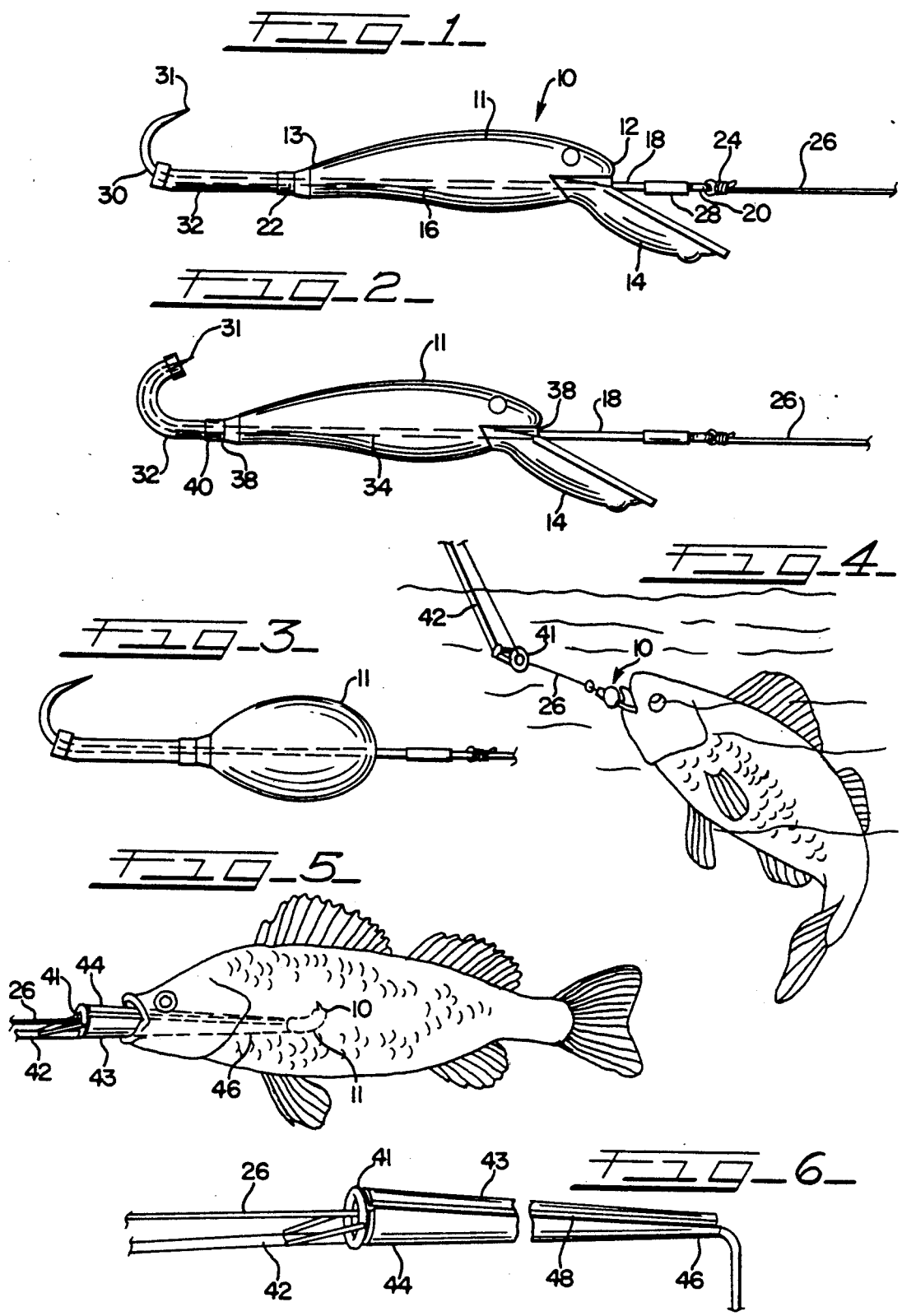

RETRACTABLE BARBLESS FISHING LURE

TECHNICAL FIELD OF THE INVENTION

The present invention generally relates to barbless fishhooks and other devices for practicing catch and release conservation techniques for sport fishing and, in particular, to a novel fishing lure assembly embodying a retractable barbless fishhook.

BACKGROUND OF THE INVENTION

Recently, sport fishing has placed a greater emphasis on the use of conservation techniques to preserve and enhance the quality of a fishery, thereby perpetuating enjoyment of the sport. To this end, various government agencies have imposed limits on the number of certain species of fish which may be taken, as well as minimum size requirements on certain species. In addition, many anglers voluntarily practice what is called "catch and release," in which an angler releases his catch unharmed soon after landing it. Catch and release is urged where sport fishing pressure is high, and is even mandatory in some waters.

One of the deficiencies in practicing catch and release, however, is that it requires the angler to handle the fish to remove the embedded hook. Often, the angler may damage the fish through such handling by inadvertently removing a portion of the mucus coating that protects a fish from infection, or damaging sensitive gill tissue. Also, lifting a fish from the water may cause inner organs to gravitate downward, thereby causing internal injury to the fish. Due to mishandling of hooked fish, it is estimated that nearly one-half of the fish released either die or are sufficiently weakened to become a subject of predation.

To enhance immediate release and minimize traumatic handling of the fish, barbless fishhooks, hooks with retractable barbs and other forms of tackle, have been developed. Due to the curvature of a barbless hook, however, it is still necessary to remove the fish from the water to some extent to effect hook removal. This is especially true where the fish has completely swallowed the bait and is gullet-hooked rather than lip-hooked. Therefore, prior to the present invention, a need existed for a tackle device which would allow removal of a hook from a fish while minimizing handling of the fish. In addition, a need also existed for a device which would facilitate removal of the hook from the fish without removing the fish from the water. A need further existed for accomplishing the foregoing objectives for gullet-hooked fish.

SUMMARY OF THE INVENTION

According to the present invention, a terminal tackle device has been developed embodying a retractable barbless fishhook for removal of the hook from a landed fish with minimal physical handling of the fish and, in some instances, without removing the fish from the water. The terminal tackle device of the present invention generally includes a body portion being open at each end and having an internal longitudinal channel connecting each open end. A shank extends through the longitudinal channel such that portions of the shank extend from opposite ends of the body. An end of the shank has means for attaching the shank to a fishing line. A barbless bend portion having a terminal end point is integral with an other end of the shank and is outside of the body. The shank is slidably movable within the longitudinal channel of the body. A deformable sleeve having inner dimensions larger than the outer dimensions of the barbless bend portion is adapted to slidably and substantially conceal the barbless bend portion.

The terminal tackle device of the present invention operates in the following manner. When a fish has been hooked on the terminal point of the barbless bend portion, the angler beings to retrieve the hooked fish. Once the fish is reeled in such that the fish is within the angler's reach, the angler grasps the body of the device, and pulls forward on the line attached to the shank. This causes the shank to move forward and the deformable sleeve to abut the rear of the body and slide along the length of the barbless bend portion until it is substantially concealed. As a result, the barbless point is withdrawn from the fish, thereby effecting a release of the fish with minimal handling by the angler and preferably without removing the fish from the water.

Alternatively, once a fish has been hooked, the angler can direct the tip of the fishing rod and a terminal guide thereon toward the fish. Preferably, the terminal guide is partially submerged in the water. Retrieval continues until the body of the device abuts against the terminal guide of the fishing rod. By continuing retrieval, sufficient tension is created in the fishing line to cause the shank to move forward within the longitudinal channel, thereby causing the deformable sleeve to slide along the barbless bend portion and release the fish from the barbless hook. This is done without handling the fish and preferably without removing the fish from the water.

In another embodiment of the present invention, a tapered sleeve having a longitudinal slit extending from end to end of the tapered sleeve is used to remove the present invention from gullet-hooked fish. Generally, the fishing line is drawn into the tapered sleeve through the slit. A wider end of the tapered sleeve is inserted into the terminal guide of the fishing rod. The gullet-hooked fish is retrieved to such a point that a narrower end of the tapered sleeve inserts into the mouth of the fish and partially into the gullet. With further retrieval action, tension is created in the fishing line to effect a retraction and withdrawal to the point of the bend segment in a manner indicated above.

Other advantages and aspects of the invention will become apparent upon making reference to the specification, claims and drawings to follow.

BRIEF DESCRIPTION OF THE DRAWINGS

FIG. 1 discloses a perspective view of one embodiment of the present invention;

FIG. 2 discloses the barbless bend portion in a fully retracted position;

FIG. 3 discloses a perspective view of another embodiment of the present invention;

FIG. 4 illustrates the retrieval of a fish lip-hooked with the present invention;

FIG. 5 illustrates the use of the tapered sleeve attachment disclosed in FIG. 6; and FIG. 6 discloses a further embodiment of the present invention utilizing a tapered sleeve attachment for gullet-hooked fish.

DETAILED DESCRIPTION OF THE PREFERRED EMBODIMENT

While this invention is susceptible of embodiment in many different forms, as shown in the drawings and described in detail herein, a preferred embodiment of the invention will be described with the understanding that the present disclosure is to be considered as an exemplification of the principles of the invention, and is not intended to limit the broad aspect of the invention to the embodiment illustrated.

Referring to the drawings, FIG. 1 discloses one embodiment of a terminal tackle device 10 for releasing hooked fish with minimal handling of the fish and preferably without removing the fish from the water. The device 10 is comprised of a body 11 having a front end 12 and a rear end 13 which, as shown in FIGS. 1 and 2, may be made to simulate a bait fish or other lure. The body 11 may also be made from material which imparts buoyancy, such as balsa wood, to run at shallower levels upon retrieval. The body 11 may also be made from a material which may be weighted to sink to run at deeper levels upon retrieval. A lip 14 may also be attached to the front of the body 11 to make the device dive to different depths depending on the size and angle of the lip 14. The lip 14 would, preferably, be used on embodiments wherein the body 11 is buoyant.

FIG. 3 discloses another embodiment of the present invention wherein the body 11 comprises a preferably round or oval-shaped jig. The jig-type body 11 is preferably made of lead or some other weighted material, and may be skirted with marabou, hackles, or the like.

The device 10 further includes a longitudinal channel 16 running through the body 11. A shank 18 having a one end 20 and an other end 22 extends through the longitudinal channel 16 and is of a length such that portions of the shank 18 extend outwardly from opposing ends of the body 11. The shank 18 is slidably movable through the longitudinal channel 16 of the body 11. At the one end 20 of the shank 18 is means 24 for attaching the shank 18 to a fishing line 26. Preferably, the means 24 takes the form of an eye integral with the one end 20 of the shank 18. The fishing line 26 can then be tied to the eye in any conventional manner. Preferably, a stop 28 is positioned near the one end 20 of the shank 18 to prevent the shank 18 from completely withdrawing into the longitudinal channel 16. A barbless bend portion 30 is integral with the other end 22 of the shank 18. At a terminal end of the barbless bend portion 30 is a point 31. The point 31 serves to hook and land the fish. The point 31 is preferably barbless to facilitate a "hands off" release of hooked fish. To further increase fish-hooking power, the barbless bend portion 30 may be obliquely angled from that of the shank 18.

A deformable sleeve 32 is adapted to slidably engage the barbless bend portion 30 at the rear end 13 of the body 11. The deformable sleeve 32 is preferably attached at one end to the rear end 13 of the body 11. The deformable sleeve 32 is of a length approximately equal to the arcuate length of the barbless bend portion 30 to substantially conceal the barbless bend portion 30 in the operative position. The deformable sleeve 32 is of sufficient rigidity to prevent the deformable sleeve 32 from sliding around the barbless bend portion 30 from the force of water against the body 11 upon retrieval, or the weight of the body 11.

Preferably, an inner sleeve 34 having a first end 36 and a second end 38 extend through the longitudinal channel 16 between the opposing ends 12 and 13 of the body 11. The inner sleeve 34 may protrude from the ends 12 and 13 of the body 11, and has an inner diameter greater than the outer diameter of the shank 18 such that the shank 18 is slidably movable within the inner sleeve 34. A shoulder 40 is preferably formed in the first end 36 of the inner sleeve 34. The shoulder 40 preferably, has an inner diameter greater than the outer diameter of the deformable sleeve 32 to fittingly accept the outer surface of the deformable sleeve 32. The deformable sleeve 32 may be attached to the rear end 13 of the body 11 by insertion into the shoulder 40. The deformable sleeve 32 may be further secured to the shoulder 40 by glue or any other means.

The deformable sleeve 32 may also be attached to the inner sleeve 34 without the necessity of the shoulder 40 by merely sliding an end of the deformable sleeve 32 over the first end 36 of the inner sleeve 34. The deformable sleeve 32 may be glued to further secure it to the first end 36 of the inner sleeve 34.

The device 10 operates as follows. When a fish is hooked, it is retrieved until it is within the angler's arm's reach. To release the fish from the hook, the angler grasps the body 11 of the device 10 and simultaneously pulls either on the shank 18 or the fishing line 26 attached to the shank 18 outwardly from the body 11, thereby causing the deformable sleeve 32 to abut the rear end 12 of the body 11. As the shank is pulled through the longitudinal channel 18, the deformable sleeve 32 slides along the length of the barbless bend portion 30 as shown in FIG. 2. This causes a retraction of the barbless bend portion 30 into the deformable sleeve 32, thereby removing the fish from the hook with minimal handling and, preferably, without removing it from the water.

Alternatively, the angler retrieves the hooked fish in the customary manner. As disclosed in FIG. 4, toward the end of the retrieve the angler partially submerges the fishing rod tip and directs the tip at the hooked fish and continues to retrieve until the body 11 of the device 10 abuts a first terminal guide 41 of fishing rod 42. For this embodiment, the inner diameter of the guide 41 must be less than the outer dimensions of the body 11. This method of release is especially useful for the jig-type embodiment of FIG. 3 as it would be difficult to grasp the jig-type embodiment to disengage the fish from the barbless bend portion because of the small size of the jig. For heavier or more aggressive game fish species, it is important that the fish remain submerged in the water as the natural buoyancy of the fish in the water will assist removal of the device 10 from the fish. Retrieve is gently continued in order to tense the fishing line. This tension gradually pulls the shank 18 from the body 11 and causes a retraction of the barbless bend portion 30 into the deformable sleeve 32. This removes the point 31 from the fish in the manner above-described.

FIG. 6 discloses an attachment to be used for gullet-hooked fish which commonly occurs with pan fish and other game fish species which tend to "swallow a hook." The attachment would be most useful in conjunction with the jig-type embodiment of FIG. 3. An elongated tapered sleeve 43 is provided with an open wider end 44 and an open narrower end 46. A longitudinal straight slit 48 joins ends 44 and 46. As an alternative to straight slit 48, a helical slit may be employed. The function of slit 48 is to allow an angler to insert the sleeve 43 over the fishing line 26 in the manner illustrated in FIG. 6. As shown in FIG. 6, the wider end 44 of the sleeve 34 is secured against the terminal guide 41 of the fishing rod 42.

As shown in FIG. 5 a gullet-hooked fish is retrieved to such a point that the narrow end 46 of the tapered sleeve 43 becomes inserted into the mouth of the fish and partially into the gullet. A gentle retrieve is continued until the body 11 of the device 10 abuts against the narrower end 46, thereby initiating the barbless bend portion 30 retraction process in the manner indicated above.

While specific embodiments have been illustrated and described, numerous modifications come to mind without significantly departing from the spirit of the invention, and the scope of protection is only limited by the scope of the accompanying claims.

What is claimed is:

1. A terminal tackle sport fishing device comprising:
   a body having a front end and a rear end, said body also having a longitudinal channel between said front and rear ends;
   a shank having a one end and an other end, said shank also having an outer diameter less than the inner diameter of said longitudinal channel, and extending through said longitudinal channel such that said one end and said other end of said shank project from said front and rear ends of said body, respectively;
   means for attaching said one end of said shank to a fishing line;
   a barbless bend portion integral with said other end of said shank and having a sharpened point at a terminal other end thereof; and
   a deformable sleeve adapted to slidably and substantially conceal said barbless bend portion.

2. The device of claim 1 wherein said body is made to simulate a bait fish.

3. The device of claims 1 or 2 wherein said body is made from a material to achieve water buoyancy.

4. The device of claims 1 or 2 wherein said body is weighted to eliminate water buoyancy, thereby causing the device to sink.

5. The device of claim 1 further comprising a lip attached to said front end of said body, thereby causing said device to dive upon retrieval.

6. The device of claim 1 wherein said attaching means comprises an eye integral with said one end of said shank.

7. The device of claim 1 wherein said deformable sleeve is attached at one end to said rear end of said body.

8. The device of claim 1 further comprising an inner sleeve having a first and a second end extending through said longitudinal channel between said front and rear ends of said body.

9. The device of claim 8 wherein said inner sleeve has an inner diameter greater than the outer diameter of said shank such that said shank is slidably movable within said inner sleeve.

10. The device of claim 8 wherein said inner sleeve projects from opposing ends of said body.

11. The device of claim 10 wherein said deformable sleeve is attached at one end to said inner sleeve.

12. The device of claim 8 wherein said inner sleeve has at its first end a shoulder.

13. The device of claim 12 wherein said shoulder has an inner diameter greater than that of the outer diameter of said deformable sleeve to fittingly accept one end of said deformable sleeve.

14. The device of claim 13 wherein said deformable sleeve is attached at one end to said shoulder.

15. The device of claim 1 in combination with a fishing rod having at least one guide at a terminal end thereof, said fishing rod carrying a retrieving fishing line, said one guide of said rod having an inner dimension to permit passage of at least said fishing line, wherein said body has outer dimensions generally larger than the inner dimension of said one guide of said fishing rod.

16. The device of claim 15 further comprising a tapered sleeve being open at each end, said sleeve having a longitudinal slit extending to each end, said slit permitting fishing line to be inserted into said tapered sleeve such that upon landing a gullet hooked fish, said tapered sleeve is positioned over the fishing line with a wider end of said tapered sleeve abutting against said one guide of said fishing rod, said device and the hooked fish are retrieved so that a narrower end of said tapered sleeve passes through the mouth of the fish and into the fish gullet until said body abuts against said narrower end of said tapered sleeve, further retrieval causes said shank to retract said barbless bend portion into said deformable sleeve, thereby withdrawing said point from within the fish effecting a release of the fish.

* * * * *